Figure 1:
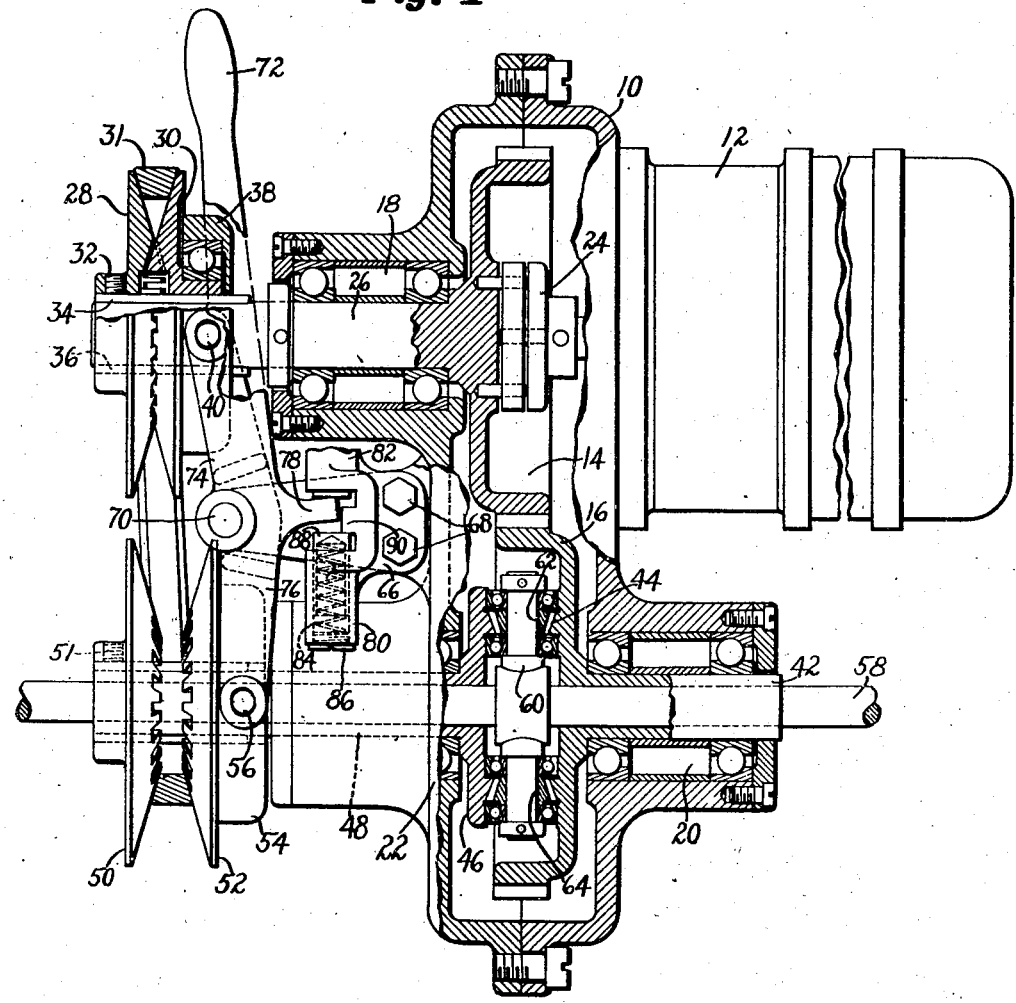

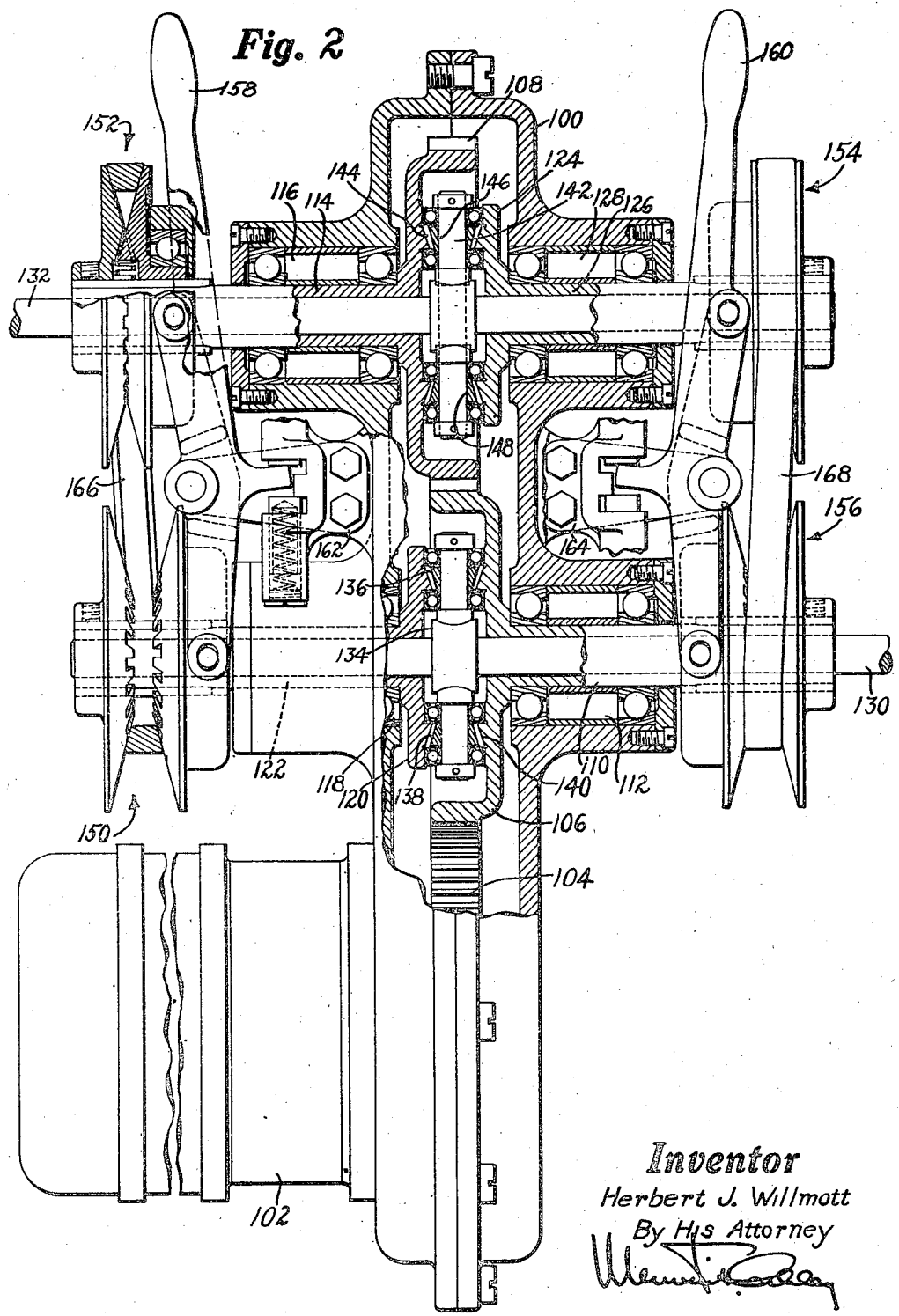

Patented Nov. 12, 1946

2,410,915

UNITED STATES PATENT OFFICE 2,410,915

REVERSIBLE AND VARIABLE-SPEED MECHANISM

Herbert J. Willmott, Beverly, Mass., assignor to United Shoe Machinery Corporation, Flemington, N. J., a corporation of New Jersey Application January 19, 1944, Serial No. 518,893

7 Claims. (Cl. 74—286)

This invention relates to improvements in reversible and variable speed differential mechanisms for transmitting power.

The transmission herein disclosed may have a broad field of utility, being readily adaptable for the driving of boats, land vehicles or machine tools or for manipulating guns in azimuth and elevation.

It is an object of this invention to provide an improved and simplified mechanism by which motive power from a member rotating in one direction may be transmitted to a power output member to rotate it either in the same direction as the first-named member or in the opposite direction and at a selected speed, both direction and speed being determined by the positioning of a lever member biased to a predetermined position.

A further object is to provide an improved mechanism by which motive power from a member rotating in one direction may be transmitted independently to either one or both of two power output members to rotate one or both of them either in the same direction as the first-named member or in the opposite direction and at controlled and variable speeds.

To this end, and in accordance with an important feature of the invention, there is provided a novel power transmission in which the rotation of a constantly driven power input shaft may be imparted to a power output shaft at varying rates of speed up to a maximum rate in either direction through a zero position by the use of a single differential gear drive and a control lever biased to a predetermined position.

A further feature of the invention comprises novel structure in which power from a single source is divided and transmitted to both sides of each of two differential power units, one side of each unit being connected by a variable speed drive to one side of the other unit, the other sides of the units being geared together, and the two sides of each unit being arranged to drive through pinion gearing a spider or arm affixed to a power output shaft to rotate that shaft at a speed and in a direction determined by the setting of one of the variable speed drives.

The invention may be more fully understood from the following description taken together with the accompanying drawings, in which Fig. 1 shows a view, partly in section, of one embodiment of the invention having a single power output shaft; and Fig. 2 shows a similar view, partly in section, of a second embodiment of the invention in which two power output shafts are provided and which may be driven independently of each other.

In the simplest form a split housing 10 is utilized, to the outside of which is attached a motor 12. Within the housing 10 a gear train consisting of meshed spur gears 14 and 16 are suitably journaled in bearings generally indicated by the numerals 18, 20, and 22. The diameters of gears 14 and 16 may be made equal. The armature of the motor 12 is arranged to drive the gear 14 by means of a suitable coupling 24. Integral with the gear 14 is a shaft 26 which extends outside of the gear housing. On the end of the shaft 26 are keyed the two halves 28 and 30 of a V-type variable diameter pulley. The pulley half 28 is rigidly fastened to the shaft 26 by a screw 32 and keys 34 and 36. The other half 30 of the pulley is axially slidable on the shaft 26 but is not rotatable thereon because of keys 34 and 36. The axially slidable portion 30 of the pulley has a hub upon which an annular ring 38 is held and retained by a ball bearing arrangement as shown. The ring 38 has pins 40 extending from both sides thereof, only one pin 40 being shown. The gear 16 is integral with a sleeve 42 suitably journaled in the bearing 20, and an internal annular bevel gear 44 is formed on the gear 16. Coaxial with the gear 16 and sleeve 42 is mounted a bevel gear 46 having integral therewith a sleeve 48 journaled in the bearing 22. The sleeve 48 extends outside of the gear housing 10, and pulley halves 50 and 52 similar to the pulley halves 28 and 30 are mounted on the sleeve. Pulley half 52 is also provided with an annular ring 54 similar to the annular ring 38 and is also provided with pins 56 similar to the pins 40. Pulley half 50 is rigidly attached to the sleeve 48 by means of set screws 51. A shaft 58 extends entirely through the sleeves 42 and 48 and also through the pulley halves 50 and 52 for power output purposes at either end. Between the coaxial gears 16 and 46 a spider 60 is affixed to the shaft 58 having pinion gears 62 and 64 mounted thereon for rotation. The annular bevel gear 44, taken together with the spider 60 and pinion gears 62 and 64 may be taken to constitute a differential gearing means. A bracket 66 is mounted on the gear housing 10 by means of bolts 68. At one end of the bracket 66 is a bearing member 70 upon which is pivoted a control lever 72 having yoke arms 74 and 76 as well as a short finger 78. The two yoke arms 74 as well as the two yoke arms 76 are provided with slots to accommodate the pins 40 and 56 respectively. The bracket 66 is also provided with spring retaining means 80 and 82 of identical structure. Spring retaining means 80 is depicted fully and a compression spring 84 is shown with a screw head 86 arranged to adjust the compression of the spring. A head 88 is mounted for vertical motion within the member 80 and encloses one end of the spring 84. The frame member 66 has a stop or protuberance 90 serving to limit the upward motion of head 88. A V-type belt 31 connects the pulleys.

From the above description it will be seen that gears 14 and 16 are driven in opposite directions by the motor 12 and that the V-belt connection between the pulleys will cause the sleeve 48 together with the bevel gear 46 to rotate in a direction opposite to the direction of rotation of the gear 16. If the gears 14 and 16 are of the ratio of one-to-one they will rotate at equal speeds but in opposite directions. When the effective diameters of the pulleys forming the variable drive unit are the same, the shaft 26 and the sleeve 48 will be rotated at equal speeds and in the same direction. Assuming that the above conditions exist, gears 16 and 46 will rotate in opposite directions and at equal speeds and hence the spider 60 and consequently the output shaft 58 will not rotate because of the differential action of pinion gears 62 and 64. If the relative effective diameters of the pulleys are varied by changing the position of the control lever 72 the balanced condition of the differential will be disturbed and rotation of the output shaft 58 will occur, the speed and direction of said rotation being dependent upon the relative speeds of the members forming the other elements of the differential and the position of the control lever 72. Thus, it will be understood that by appropriate adjustment or movement of the lever 72, shaft 58 may be caused to rotate in either direction and at any speed between zero and a maximum, which is determined by the speed of rotation of the motor 12. Release of lever 72 will cause a centering of lever 72 by action of the springs upon the short finger 78. The centered or predetermined position of lever 72 may be chosen to give non-rotation of the shaft 58 or some definite speed and direction of rotation of that shaft.

It is to be understood that the motor 12 can be connected up to drive the gear 16 instead of the gear 14 and that it could be mounted in positions other than as shown in Fig. 1 and could drive either of gears 16 or 14 through intermediate gears forming a part of the gear train.

In Fig. 2 is shown an arrangement whereby power is imparted from a single source of power to two independently driven power output shafts. A gear housing 100 is provided to which is attached a motor 102 arranged to drive a gear 104 which in turn is arranged to drive a gear train made up of spur gears 106 and 108. The gear 106 is provided with a sleeve 110 journaled in a bearing generally indicated by the character 112. The gear 108 has integral therewith a sleeve 114 journaled in a bearing generally indicated by the character 116. Coaxially mounted in a bearing 118 with the gear 106 is a separate bevel gear 120 having an integral sleeve 122. In alinement with the gear 108 and sleeve 114 a separate bevel gear 124 is supported on a sleeve 126 within a bearing 128. A power output shaft 130 is mounted for free rotation within the two sleeves 110 and 122. A second power output shaft 132 is freely rotatable within the sleeves 114 and 126. Attached rigidly to the shaft 130 is a spider 134 having gear pinions 136 and 138 mounted thereon.

Gear 106 is provided with an internal bevel gear 140 and the pinion gears 136 and 138 are mounted in engagement with annular bevel gear 140 and the bevel gear 120. The shaft 132 is provided with a spider 142 rigidly affixed thereto. Gear 108 has an annular bevel gear 144, and pinion gears 146 and 148 are mounted on the spider 142 for engagement between the bevel gear 124 and the annular bevel gear 144. The outer end of sleeve 122 is provided with a V-type split pulley 150 which is similar to the arrangement used on the outer end of sleeve 48 in Fig. 1. The sleeves 114, 126 and 110 are provided with similar V-type split pulley arrangements 152, 154 and 156, respectively. Two control levers 158 and 160, together with spring biased centering devices are mounted on the gear casing by means of brackets 162 and 164 and each is in all respects similar to the control lever 72 arrangement in Fig. 1. Belts 166 and 168 are placed upon the opposed pulleys.

It will be seen from the above description, that the operation of each power output shaft is the same as the operation of the power output shaft 58 in Fig. 1. To drive the shaft 130, gear 106 will be rotated in one direction and because of the gear and pulley arrangement the bevel gear 120 will be rotated in the reverse direction at a rate of speed dependent upon the manipulation or setting of lever 158. If the gears 106 and 120 are rotated in opposite directions and at the same rate the shaft 130 will not be rotated because of the differential action, i. e. pinion gears 136 and 138 will rotate on the spider 134 without imparting rotation to the spider. If the lever 158 be moved to the right, as viewed in Fig. 2, the effective diameter of pulley 152 will be decreased and the effective diameter of the pulley 150 will be increased with the result that bevel gear 120 will rotate at a lower rate of speed, causing the spider 134 and the shaft 130 to rotate in one direction at a corresponding speed. If the control lever 158 be moved to the left, the effective ratio of pulley diameters will again be changed to cause rotation of shaft 130 in the opposite direction. As stated with respect to the device of Fig. 1, the centering position of lever 158 may be so arranged as to give non-rotation of the shaft 130.

The lever 160 may likewise be used to control the relative speeds of rotation in opposite directions of the gears 108 and 124 to impart nonrotation or a desired speed of rotation to spider 142 and shaft 132 in either direction.

There are several advantages to both mechanisms such as described. In the first place it can be seen that the gear casing or housing arrangement does not give rise to any complicated lubrication problems regardless of which horizontal, vertical or inclined position the shafts may be mounted. The entire device (either modification) is not complicated and each output shaft requires only one belt drive and one differential gear drive for a smooth, efficient and reliable control which is biased to some predetermined condition. The arrangement is such that it is compact and can be installed where space is at a premium. It is to be noted that the gear housing and arrangement of power supply can be varied in numerous ways without altering the principle of operation and be adaptable to situations in which the available space for installation of the transmission is of a particular configuration.

Having described the invention, what I claim as new and desire to secure by Letters Patent of the United States is:

1. A variable speed transmission including a housing with motor attached thereto, a pair of meshed gears coupled to said motor, a bevel gear coaxial with one of the meshed gears, the said three gears being journaled within the housing, a V-type variable diameter pulley speed drive directly connecting the other of said meshed gears with a sleeve attached to said bevel gear, the arrangement being such that the coaxial gears are adapted to be rotated in opposite directions, a power output shaft journaled in the housing and in the sleeve, differential gearing means including a spider and an annular bevel gear on the one of the meshed gears mounted between the coaxial gears for driving the said power output shaft, and a single controller lever for the variable speed drive biased to a desired setting for the variable speed drive.

2. A power transmission including a gear train, a bevel gear coaxial with each one of two gears of the gear train, a variable speed drive to transmit rotation from a gear in the said gear train to each bevel gear, the arrangement being such that power operation of the gear train will impart opposite directional rotation to the coaxial gears, a power output member associated with each bevel gear, and differential gearing means mounted between the coaxial gears for driving the said power output members.

3. A variable speed transmission including a housing, a pair of power driven meshed gears each having a bevel gear mounted coaxially therewith, all said four gears being journaled within the housing, a variable speed drive connecting each of said meshed gears with the bevel gear coaxial with the other one of said meshed gears, the arrangement being such that the coaxial gears are rotated in opposite directions, a power output shaft for each bevel gear, and differential gearing means mounted between the coaxial gears for driving the said power output shafts.

4. A power transmission including a gear train, a bevel gear coaxial with each one of two gears of the gear train to constitute two pairs of coaxially mounted gears, a V-type variable diameter pulley drive to transmit rotation from a gear in the said gear train to each bevel gear, the arrangement being such that power operation of the gear train will impart opposite directional rotation to the coaxially mounted gears of each pair, a power output member associated with each bevel gear, differential gearing means mounted between the coaxial gears of each pair for driving its associated power output member, and means for controlling the relative diameters of the pulleys.

5. A variable speed transmission including a housing, a pair of power driven meshed gears, a sleeve and a bevel gear attached to the sleeve being journaled in a position coaxial with each of the meshed gears and all four gears being journaled within the housing, a variable speed drive connecting each of said meshed gears with the sleeve of the bevel gear which is coaxial with the other one of said meshed gears, the arrangement being such that the coaxial gears are rotated in opposite directions, a power output shaft journaled in each sleeve, and differential gearing means mounted between the coaxial gears for driving the said power output shafts.

6. A variable speed transmission including a housing, a pair of power driven meshed gears each having an annular bevel gear attached thereto, a separate bevel gear coaxial with each of the meshed gears and all the gears being journaled within the housing, a variable speed drive connecting each of said meshed gears with the separate bevel gear which is coaxial with the other one of said meshed gears, the arrangement being such that the coaxial gears are rotated in opposite directions, a power output shaft for each separate bevel gear with a spider attached thereto, and differential pinion gears mounted on the spiders for engagement with and between the coaxial gears for driving the said power output shafts.

7. A variable speed transmission including a housing, a power driven gear train having attached to each of two of its gears an annular bevel gear said two gears being mounted on sleeves for rotation within the housing, a separate bevel gear coaxial with each of the said two gears and being mounted on sleeves for rotation within the housing, a V-type variable diameter pulley drive connecting each of said two gears with the separate bevel gear which is coaxial with the other one of said two gears, the arrangement being such that the coaxial gears are rotated in opposite directions, a power output shaft for each separate bevel gear and passing through its sleeve, differential gearing means mounted between coaxial gears for driving the said power output shafts, and means for controlling the relative diameters of the pulleys.

HERBERT J. WILLMOTT.